(12) United States Patent
Mäenpää

(10) Patent No.: US 8,526,331 B2
(45) Date of Patent: Sep. 3, 2013

(54) MAINTAINING DISTRIBUTED HASH TABLES IN AN OVERLAY NETWORK

(75) Inventor: Jouni Mäenpää, Nummela (FI)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 225 days.

(21) Appl. No.: 12/993,990

(22) PCT Filed: May 23, 2008

(86) PCT No.: PCT/EP2008/056376
§ 371 (c)(1),
(2), (4) Date: Dec. 13, 2010

(87) PCT Pub. No.: WO2009/141013
PCT Pub. Date: Nov. 26, 2009

(65) Prior Publication Data
US 2011/0110269 A1   May 12, 2011

(51) Int. Cl.
*H04L 12/28* (2006.01)
(52) U.S. Cl.
USPC .................. 370/254; 370/351; 370/392
(58) Field of Classification Search
None
See application file for complete search history.

(56) References Cited

U.S. PATENT DOCUMENTS

| | | | | |
|---|---|---|---|---|
| 7,640,339 B1 * | 12/2009 | Caronni et al. | ............... | 709/224 |
| 7,684,352 B2 * | 3/2010 | Smith et al. | ................ | 370/255 |
| 7,881,223 B2 * | 2/2011 | Shim et al. | ................ | 370/254 |
| 8,130,676 B2 * | 3/2012 | Shim et al. | ................ | 370/254 |
| 8,233,489 B2 * | 7/2012 | Welin et al. | ............... | 370/395.32 |
| 2007/0230482 A1 | 10/2007 | Shim et al. | | |
| 2008/0225780 A1 * | 9/2008 | McCormick et al. | ......... | 370/328 |

FOREIGN PATENT DOCUMENTS

EP   1 748 604 A1   1/2007

OTHER PUBLICATIONS

Hu et al. "General Clusters in Peer-to-Peer Networks" The 11th IEEE International Conference, Piscataway, New Jersey, Sep. 28, 2003, pp. 277-282.
International Search Report and Written Opinion, PCT Application No. PCT/EP2008/056376, Date of Mailing: May 28, 2009.
International Preliminary Report on Patentability, PCT/EP2008/056376/051005, Date of Mailing: Sep. 7, 2010.

(Continued)

*Primary Examiner* — Ayaz Sheikh
*Assistant Examiner* — Blanche Wong
(74) *Attorney, Agent, or Firm* — Myers Bigel Sibley & Sajovec, P.A.

(57) ABSTRACT

A method of maintaining routing tables at nodes of an overlay network, where a routing table of a given node contains, for each of a set of neighboring successor and predecessor nodes, a mapping between an overlay network address of the node and a physical locator of the node. The method comprises, upon or immediately prior to departure of a node from the overlay network, sending a Leave request from the departing node (or one of the neighboring nodes of the departing node aware of the departure) to each neighboring node (or each other neighboring node of the departing node), indicating the departure and containing one or more mappings for nodes not contained within the routing table of the recipient node. Each neighboring node (or each other neighboring node) receives the Leave request and uses said mapping(s) to update its routing table.

16 Claims, 4 Drawing Sheets

(56) References Cited

OTHER PUBLICATIONS

Li et al. "A performance vs. cost framework for evaluating DHT design tradeoffs under churn" 24$^{th}$ Annual Joint Conference of the IEEE Computer and Communications Societies Piscataway, New Jersey, Mar. 13-17, 2005, pp. 225-236.

Rhea et al. "Handling Churn in a DHT" Proceedings of the General Track: 2004 USENIX Annual Technical Conference, Boston, MA., Jun. 27-Jul. 2, 2004, pp. 127-140

Rowstron et al. "Pastry: Scalable, Decentralized Object Location, and Routing for Large-Scale Peer-to-Peer Systems" Middleware 2001, Lecture Notes in Computer Science, vol. 2218, pp. 329-350, Nov. 12, 2001.

Stoica et al. "Chord: A Scalable Peer-to-Peer Lookup Protocol for Internet Applications" IEEE/ACM Transactions on Networking, 11(1): 17-32, Feb. 2003.

Zangrilli et al. "A Bamboo-based DHT for Resource Lookup in P2PSIP draft-zangrilli-p2psip-dsip-dhtbamboo-00" IETF Standard-Working-Draft, Internet Engineering Task Force, Feb. 25, 2007, pp. 1-15.

Zeng et al. "ReCord: A Distributed Hash Table with Recursive Structure" Proceedings of the Sixth International Conference on Parallel and Distributed Computing, Applications and Technologies, Piscataway, New Jersey, Dec. 5, 2005, pp. 16-20.

Toshiyuki Shiraishi, "An Efficient Routing Information Maintenance Method in Chord Networks", IEICE Technical Report, vol. 106, No. 577, Japan, IEICE, Mar. 1, 2007, pp. 137-142.

Tomohiro Nishitani, "Primer of Distributed Hash Table", UNIX magazine vol. 21, No. 6, Japan, ASCII Corporation, Sep. 21, 2006, pp. 26-33.

Sean Rhea, "Handling Churn in a DHT", Appears in Proceedings of the USENIX Annual Technical Conference, Jun. 2004.

Motonori Nakamura, "High Availability of DHT Lookup in Partitioned Networks", Proceedings of the IEICE General Conference Communication 2, Japan, IEICE, Mar. 7, 2005, S-26, S-27.

Japanese Office Action (6 pages) corresponding to Japanese Patent Application No. 2011-509861; Issue Date: Apr. 5, 2013.

\* cited by examiner

MAINTAINING DISTRIBUTED HASH TABLES IN AN OVERLAY NETWORK

CROSS REFERENCE TO RELATED APPLICATIONS

This application is a 35 U.S.C. §371 national stage application of PCT International Application No. PCT/EP2008/056376, filed on 23 May 2008, the disclosure and content of which is incorporated by reference herein in its entirety. The above-referenced PCT International Application was published in the English language as International Publication No. WO 2009/141013 A1 on Nov. 26, 2009.

TECHNICAL FIELD

The present invention relates to a mechanism for maintaining distributed hash tables in an overlay network. The invention is applicable in particular to an optimised procedure for handling the leaving of a node from an overlay network

BACKGROUND

Peer-to-peer or P2P networks make use of the pooled resources of participating nodes including processing capabilities and communication bandwidth to facilitate a wide variety of services including file sharing and VoIP telephony. In the absence of central servers, particular P2P services may make use of "overlay networks" to optimise resource location. An overlay network comprises nodes connected by virtual links representing paths extending across possibly many physical links in the underlying network (e.g. the Internet). Each node in the overlay network maintains a routing table containing a set of links to certain other nodes within the overlay network. Resource requests are passed between nodes until they arrive at a node which is responsible for that resource.

Distributed Hash Tables (DHT) provide an efficient means for mapping resource names ("keys") to locations within an overlay network. DHT makes use of a hashing algorithm to map keys, e.g. song titles, SIP URIs, etc, to a finite value space, e.g. 128 bits. The hashing algorithm is chosen to ensure a relatively uniform spread of hash values across the value space. Thus, for example, the hashing of 100 song titles will likely result in 100 hash values that are relatively evenly spaced across the value space. Nodes within an overlay network are identified by usernames, which are themselves hashed into respective hash values. Each node then becomes responsible for a set of hash values within the value space which neighbour its own value. In practice, a node will store locations (e.g. IP addresses) from which resources, matching resource names which it "owns", can be obtained. When a node in the overlay network receives a request for a resource, the node determines whether or not it owns the corresponding hash value. If so, it returns the location of the resource to the requester (via the overlay network). If it does not own the hash value, it inspects its routing table to identify that node within the table which has a hash value closest to the hash value of the request, and forwards the request to that node. The receiving node repeats the procedure, and so on until the request arrives at the node which does own the hash value corresponding to the request and which therefore knows the resource location.

Figure 1:
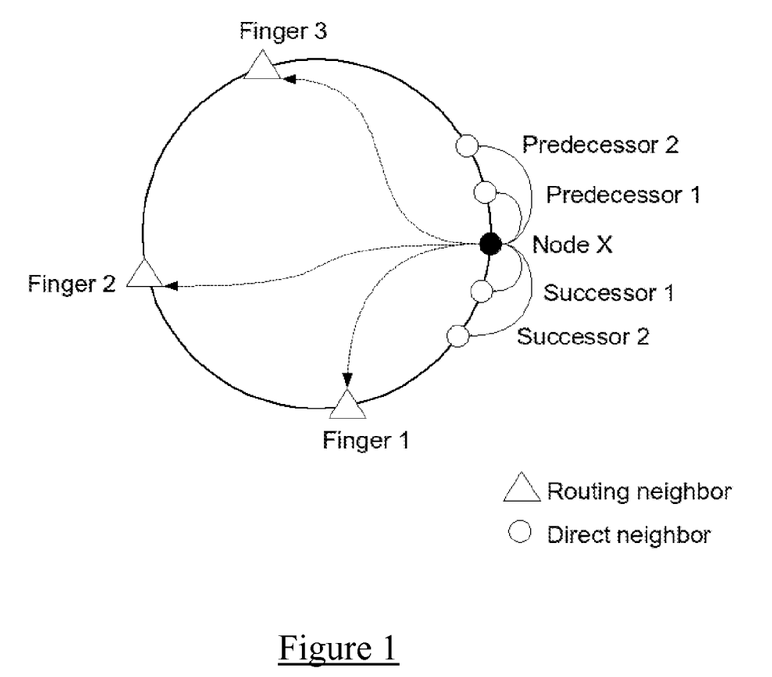
FIG. 1 illustrates schematically a DHT-based ring overlay network comprising a number of nodes.

FIG. 1 illustrates an overlay network organised as a ring (only a small number of the nodes within the ring are illustrated). In this example, each node maintains a routing table containing the locations and hash values of a small number of succeeding and preceding nodes in the ring, as well as for a small number of more distant nodes. In the illustrated network, a Node X maintains within its routing table locations for two successor nodes and two predecessor nodes, as well as for three remote nodes. Whilst a larger number of entries within the routing tables can make the network more efficient in terms of routing and more robust against node withdrawal, large tables are difficult to maintain and therefore increase the unreliability of the network.

A node within the overlay network ensures that the information in its routing table is up to date by attempting to contact its neighbours periodically. A number of different mechanisms may be used for this purpose:

1) A node can periodically send keep-alive messages to check that the other nodes listed in its routing table have not left the overlay network. This mechanism is used by DHT approaches such as Pastry [A. Rowstron and P. Druschel: Pastry: Scalable, distributed object location and routing for large-scale peer-to-peer systems. Middleware, 2001], Chord [I. Stoica, R. Morris, D. Karger, M. F. Kaashoek and H. Balakrishnan: Chord: A Scalable Peer-to-peer Lookup Service for Internet Applications. In Proceedings of the ACM SIGCOMM'01 Conference, August 2001, San Diego, Calif., USA.] and Content Addressable Network (CAN) [S. Ratsanamy, P. Francis, M. Handley, R. Karp and S. Shenker: A scalable content-addressable network. In Proceedings of ACM SIGCOMM 2001, August 2001].

2) A node can periodically send queries to learn about new nodes that could be inserted into the routing table, replacing old entries (e.g. Chord).

3) A node can periodically send queries to its direct neighbours requesting information about the entries in its neighbours' routing tables. This information is used to update the node's own routing table (e.g. Chord).

4) A node can periodically send its own routing table to its neighbours (e.g. CAN).

Another (additional) approach to maintaining the routing tables involves a node checking whether the originator of a resource request could be inserted into its routing table (e.g. Kademlia [P. Maymounkov and D. Mazieres: Kademlia: A peer-to-peer information system based on the xor metric. In Proceedings of IPTPS02, Cambridge, USA, March 2002]).

Figure 2:
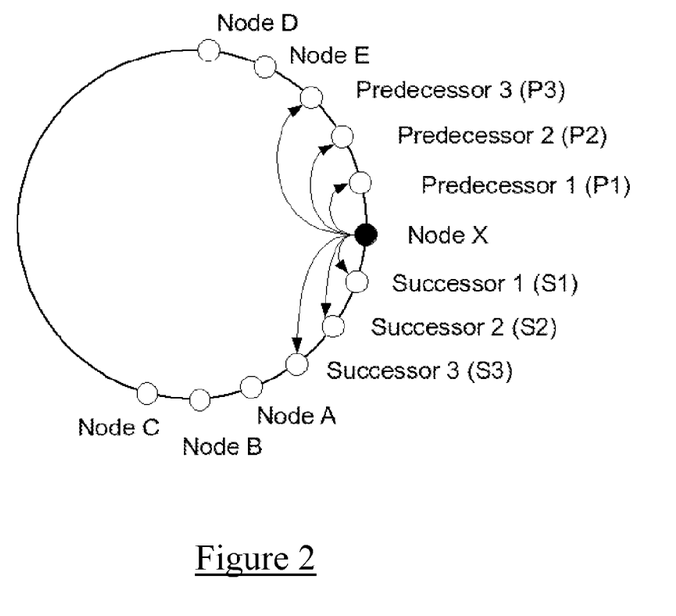
FIG. 2 further illustrates a DHT-based ring overlay network, showing neighbourhood relations between nodes.

Consider FIG. 2 which shows an example of neighbourhood relations in a DHT. In the Figure, a ring topology is assumed. Node X maintains three successors and three predecessor pointers in its routing table. It should already be clear that the reason for maintaining multiple successor and predecessor pointers is to increase robustness. If the probability that a single successors will fail is p, then the probability that all three successors will fail simultaneously is $p^3$. However, in extremely large real-world DHT-based overlay networks, this is not sufficient to maintain connectivity in the network; if all three successors (or alternatively, all three predecessors) of a given node leave the network within a sufficiently short period of time, the network fragments.

Nodes can leave the network either gracefully or ungracefully. When leaving gracefully, a node informs its neighbours about its intention to leave the network prior to actually leaving. The node does this by sending a Leave message (understood at the application layer). This allows the neighbours to immediately remove the leaving node from their routing tables. When a node leaves the network ungracefully, it exits the network without first informing its neighbours. Therefore, the neighbours must detect for themselves that the node has left. Reasons for ungraceful leaving include the following: (i) the node has crashed, (ii) the P2P application has crashed or has been closed down unexpectedly, and (iii) selfish behaviour. In alternative (iii), a user may choose to leave ungracefully in order to avoid delays inherent in a graceful departure.

In the case of an ungraceful departure from the overlay network, nodes can learn that a neighbour has left in two different ways:

1) When the underlying transport protocol is reliable (e.g. TCP), the departure of a neighbour is detected quickly from the fact that the transport layer connection goes down.
2) When the transport protocol is unreliable (e.g. UDP), a node does not learn that the neighbour has left until it attempts to send the next periodic DHT maintenance message to the neighbour. In addition to waiting for the transmission of the next periodic maintenance message, the node also has to wait until the transaction times out before it can be certain that the neighbour has really left.

In the case of both graceful and ungraceful departure, the end result is that each of the leaving node's direct neighbours has one pointer less in its routing table. For instance, if node S1 in FIG. 1 leaves the network, Node X only has two successor pointers left, namely S2 and S3. If also S2 and S3 also leave the network before Node X has a chance to find additional successors, the overlay network becomes partitioned since Node X no longer knows any successors. A similar situation can arise in respect of the predecessor nodes of Node X.

Thus, a problem with existing solutions is that if all of the successors or predecessors of a given node fail within a short period of time, the network can become partitioned, and resource requests cannot bridge the gap. This "short period of time" refers to the time between two consecutive DHT maintenance messages. If such maintenance messages are sent for instance every 60 seconds, then the overlay network is disrupted if all the successors or predecessors of even a single node leave the overlay network within this 60 second period. This is not an unlikely event if the network is experiencing a high "churn" rate. Whilst an intuitive solution to this problem would be to send DHT maintenance messages more frequently, the interval between periodic maintenance messages cannot be made arbitrarily small as the resulting signalling load would overload the network. This problem has been confirmed by S. Rhea, D. Geels, T. Roscoe and J. Kubiatowicz: Handling Churn in a DHT, In Proceedings of the USENIX Annual Technical Conference, June 2004.

SUMMARY

It is an object of the present invention to minimise disruption to an overlay network when a node fails or otherwise withdraws from the network. At least certain embodiments of the invention achieve this object by allowing the withdrawing node, or a neighbouring node of the withdrawing node, to update the routing tables of other neighbours.

According to a first aspect of the invention there is provided a method of maintaining routing tables at nodes of an overlay network, where a routing table of a given node contains, for each of a set of neighbouring successor and predecessor nodes, a mapping between an overlay network address of the node and a physical locator of the node.

The method comprises, upon or immediately prior to departure of a node from the overlay network, sending a Leave request from the departing node (or one of the neighbouring nodes of the departing node aware of the departure) to each neighbouring node (or each other neighbouring node of the departing node), indicating the departure and containing one or more mappings for nodes not contained within the routing table of the recipient node. Each neighbouring node (or each other neighbouring node) receives the Leave request and uses said mapping(s) to update its routing table.

Embodiments of the invention allow neighbours of a withdrawing node to quickly update their routing tables with a replacement predecessor or successor node. In the event of high churn in the network, the risk of a fracture in the network chain is greatly reduced.

According to a second aspect of the invention there is provided a method of maintaining routing tables at nodes of an overlay network, where a routing table of a given node contains, for each of a set of neighbouring successor and predecessor nodes, a mapping between an overlay network address of the node and a physical locator of the node.

The method comprises, immediately prior to departure of a node from the overlay network, sending a Leave request from the departing node to each neighbouring node of the departing node, indicating the departure and containing one or more overlay network address to physical locator mappings for nodes not contained within the routing table of the recipient node. Upon receipt of a Leave request at each neighbouring node, the node uses the mapping(s) to update its routing table.

In an embodiment of this aspect of the invention, at least one mapping contained within a Leave request corresponds to a neighbouring node of the departing node which is unknown to the recipient node.

According to a third aspect of the invention there is provided a method of maintaining routing tables at nodes of an overlay network, where a routing table of a given node contains, for each of a set of neighbouring successor and predecessor nodes, a mapping between an overlay network address of the node and a physical locator of the node.

The method comprises, upon departure of a node from the overlay network, sending a Leave request from one of the neighbouring nodes of the departing node aware of the departure, to other neighbouring node of the departing node, the request indicating the departure and containing one or more mappings for nodes not contained within the routing table of the recipient node. Upon receipt of a Leave request at said each other neighbouring node, the node uses said mapping(s) to update its routing table.

In an embodiment of this aspect of the invention, the node sending the Leave request(s) detects the departure of the departing node as a result of the failure of the departing node to respond to periodically transmitted keep-alive messages. It reacts to the detection by sending the Leave request(s). Said one or more mappings for nodes not contained within the routing table of the recipient node may be mappings contained within the routing table of the node sending the Leave request.

A node receiving a Leave request may determine if the recipient node is aware of any neighbouring nodes of the departing node and of which the node sending the Leave request is unaware. If so, the receiving node sends a Leave request to that or those nodes, the Leave request containing one or more overlay network address to physical locator mappings for nodes not contained within the routing table of the recipient node. Upon receipt of the Leave request at the or each further recipient node, the node updates its routing table.

It will be understood that said step of updating the routing table at a recipient node may comprise deleting the mapping corresponding to the departing node and adding the new mappings contained within the received Leave request to the routing table.

A feature that may be advantageously incorporated into embodiments of the invention is the caching one or more mappings for nodes not included within the respective routing tables. In the event of the departure of a node from the network, the routing table of at least one neighbouring node of the departing node can be updated to include one or more of the cached mappings.

According to a fourth aspect of the present invention there is provided a node for use within an overlay network and comprising a memory for storing a routing table containing, for each of a set of neighbouring successor and predecessor nodes, a mapping between an overlay network address of the node and a physical locator of the node. The node also comprises a processing unit configured to send a Leave request to one or neighbouring nodes of the node upon departure of the node or of a neighbouring node from the network, the Leave request identifying the departing node and containing one or more overlay network address to physical locator mappings for nodes not contained within the routing table of the recipient node.

The node may comprise a further processing unit configured to receive a Leave request from a neighbouring node, to delete the mapping corresponding to the departing node identified in the Leave request from the routing table contained within said memory, and to add one or more new mappings contained within the Leave request to the routing table. A still further processing unit may be configured to determine if the Leave request originates from the departing node and, if not, to inspect said routing table to identify any neighbouring nodes of the departing node of which the node sending the Leave request is unaware, and to send a Leave request to any such identified nodes. This Leave request identifies the departing node and contains one or more mappings for nodes not contained within the routing table of the recipient node.

The node may comprise a further memory for caching one or more mappings for nodes not included within the routing table and a further processor for updating the routing table to include one or more of the cached mappings, in the event of the departure of a neighbouring node from the network.

According to a fifth aspect of the present invention there is provided a method of maintaining routing tables at nodes of an overlay network, where a routing table of a given node contains, for each of a set of neighbouring successor and predecessor nodes, a mapping between an overlay network address of the node and a physical locator of the node.

The method comprises periodically exchanging maintenance messages between said nodes in order to provide updated addressing information for nodes. When addressing information is received at a given node for a peer node and that peer node is not included within the routing table of the given node, the information is cached at the given node. In the event that a node contained within the routing table of the given node withdraws from the network, the peer node is added to the routing table using the cached information.

DETAILED DESCRIPTION

The optimized DHT leave operation described here relies upon a node assisting a neighbouring node to quickly update its routing tables in the event that the neighbouring node's routing table is affected by the departure of a node from the network. The departing node may be the neighbouring node, i.e. in the graceful departure scenario, or another neighbouring node in the case of an ungraceful departure. These two scenarios will now be considered in detail.

Reference is made again to FIG. 2 which shows an example of a Chord DHT-based overlay network using a ring topology. Whilst Chord DHT is used here by way of example, the procedures described are equally applicable to other DHT-based overlay networks. In the example illustrated, it is assumed that each node in the DHT-based overlay network maintains pointers to six neighbours: namely three predecessor nodes and three successor nodes. Of course, the proposed mechanism works with any number of successor and predecessor pointers.

In FIG. 2, a Node X has three successors: S1, S2, and S3. If the overlay network is experiencing heavy "churn", all of the successors of Node X might choose to leave the overlay network within a short time frame. Assuming that the nodes depart gracefully, they will send Leave requests to their neighbours. However, as described above, Node X may not have time to identify any other successor nodes before all three successors have left the network. In order to avoid a partitioning of the network in this scenario, each node that intends to leave the overlay helps its neighbours to fill their routing tables with alternative neighbour nodes, before actually leaving the network.

In the text below, the term "neighbour table" is used to refer to a part of the routing table containing pointers to direct neighbours, the term "predecessor table" is used to refer to the part of the neighbour table containing the predecessor pointers, and the term "successor table" is used to refer to the part of the neighbour table containing the successor pointers.

Consider the case where node S1 in FIG. 2 chooses to leave the overlay network gracefully. As with all other nodes in the network, S1 maintains pointers to neighbouring nodes in its routing table. In FIG. 2 it is assumed that node S1 maintains three predecessor and three successor pointers. The successors of node S1 are S2, S3 and A. The predecessors of node S1 include X, P1 and P2. Before leaving the network, node S1 repeats the following procedure for each of its neighbours N:

If node N is a predecessor of node S1, node S1 constructs a new successor table for N and includes it in the Leave message that is sent to node N. Node S1 should not include itself in the successor table it creates for node N. The successor table can include nodes between S1 and N as well as successors of S1. Indeed, this will be the case when N is not the immediate predecessor of S1. Some of these intervening nodes may be previously unknown to N. (According to the Chord DHT algorithm, only the successor of a newly joined node is aware of the node: other nodes will learn about the new node when the next periodic DHT maintenance message is scheduled).

If node N is a successor of node S1, node S1 crates a new predecessors table for node N and includes this in the Leave message sent to node N. This table includes any of S1's successors that are located between node S1 and node N. Node S1 should not of course include itself in the predecessors table sent to node N.

Having received the Leave message containing the successors/predecessors table from node S1, node N first removes node S1 from its routing table. Next, N goes through the list of nodes carried in the Leave message. For each node in the list, node N compares the node to the entries in its successor and predecessor tables, and inserts a node into the correct position in the table if the node is not already present.

This procedure ensures that the overlay network remains in a stable state and retains full connectivity even after the departure of node S1. That is, the departure of node S1 does not in any way hinder the operation of the network.

A different situation arises if a node (e.g. node A in FIG. 2) leaves the network without informing its neighbours. This could happen due to a sudden crash or some other abnormal termination of the P2P application, or due to selfish behaviour on the part of the leaving node. Assume that the neighbour B of node A is the first node within the overlay network to detect that node A has failed (e.g. from the fact that a periodic keep-alive message, maintenance message or any other message targeted to node A has failed). Node B is made responsible for informing the other neighbours of node A of node A's departure and for updating the contents of the other neighbours' neighbour tables. However, as node B cannot re-create the full neighbour table of node A (in this example, node B has no knowledge of S1 which is a neighbour of node A but not of node B), neighbours other than B must participate in the procedure by updating the neighbour tables of those neighbours of which node B is unaware.

In the exceptional case that the neighbour which first detects the departure of node A is the most distant successor or the most distant predecessor of node A, then that neighbour does not have any information available which the other neighbours do not already know. Thus, the most distant neighbours cannot update the contents of the closer neighbours' neighbour tables. However, the most distant neighbours can still send an empty Leave message on behalf of node A which will trigger the closer neighbours to send Leave requests with neighbour tables to other neighbours (the closer neighbours have information which benefits the other nodes).

By way of example, assume that node X in FIG. 2 leaves the network without informing its neighbours, i.e. nodes S1, S2, S3, P1, P2 and P3. Assume further that node S1 is the first node to detect that node X has left, for example due to the failure of node X to respond to a keep-alive message from node S1. Immediately after having detected the failure of node X, node S1 will create an as-accurate-as-possible representation of the contents of the neighbour table of node X. In this case, S1 can recreate information in respect of five of the six neighbours of node X. This is because S1 knows all the successors of node X and two of the predecessors of node X. Next, node S1 performs the following procedure for each neighbour N of node X that it is aware of:

Node S1 constructs the contents of the neighbour table of node N.
  Node S1 removes node X from the neighbour table it constructed for node N, chooses appropriate nodes from the recovered neighbour table of node X and inserts these into the new neighbour table for node N. More specifically, if node N is a predecessor of node X, node S1 creates a new successor table for node N. Alternatively, if node N is a successor of node X, node S1 creates a new predecessor table for node N.
  Node S1 sends a Leave request on behalf of node X to node N and includes in this the new successor or predecessor table it has created.
  Node N updates its neighbour table based on the Leave request it receives from node S1.

When determining the contents of the routing table of node X, node S1 does not know the identity of the most distant predecessor of node X, namely P3. However, both P1 and P2 know the identity of P3. Therefore, when a neighbour N of node X receives a Leave request sent by another node on behalf of node X (it can detect this as the source address of the originator of the Leave request does not match the address of node X), neighbour N carries out the following actions:

Node N recreates a representation of the contents of the neighbour table of node X. More specifically, if node N is a predecessor of node X, node N recreates the predecessor table of X. On the other hand, if node N is a successor of node X, node N recreates a representation of the successor table of node X.
  Based on the neighbour table it constructed, node N checks if it is aware of any neighbours of node X that the sender of the Leave request (i.e. node S1) is not aware of Assuming that node N is node P2 in FIG. 2, P2 detects that the sender of the Leave request, node S1, is not aware of node P3 (i.e. the third predecessor of node X).
  Node N sends a Leave request on behalf of node X to each of the neighbours of node X that the sender of the Leave request is not aware of. Assuming again that node N is node P2 of FIG. 2 and the sender is S1, P2 would send a Leave request to node P3.
  Finally, node N returns a list of the neighbours of node X of which the sender of the Leave request (i.e. node S1) is unaware of (in the response that node N generates to the Leave request). The sender of Leave request (i.e. node S1) can then insert these nodes into its predecessor table.

In the example above, the first node to detect that node X has left the overlay network was assumed to be a successor (S1). If the first node to detect that node X has left the overlay network is a predecessor, the predecessor (e.g. P1) has no knowledge of the most distant successor of node X, i.e. S3 in this example. In this case, one of the successors of node X, e.g. node S1, carries out the above-mentioned steps.

Maintenance operations are carried out in a DHT network and involve periodic message exchanges between participating nodes in order to learn about new nodes and to check the states of neighbouring nodes. However, nodes in a DHT-based overlay conventionally use only a part of the information which they receive from their neighbours to update their own routing tables, and discard the rest of the information. For instance, in the example network of FIG. 2, although node X learns about the existence of node E from its direct neighbour P1, node X normally discards this information, since it maintains only three predecessor pointers, predecessors P1, P2 and P3, in its predecessor table. However, if node X caches node E's contact information, it can more quickly recover from the possible ungraceful departure of node P1 (and also of P2 and P3). In other words, although node X does not insert node E into its neighbour table, node can X store the contact information of node E into another data structure implementing a neighbour cache. If node P1 suddenly leaves the network, node X can check the cache and contact for example node E to see if it is alive and can be added to the routing table.

Figure 3:
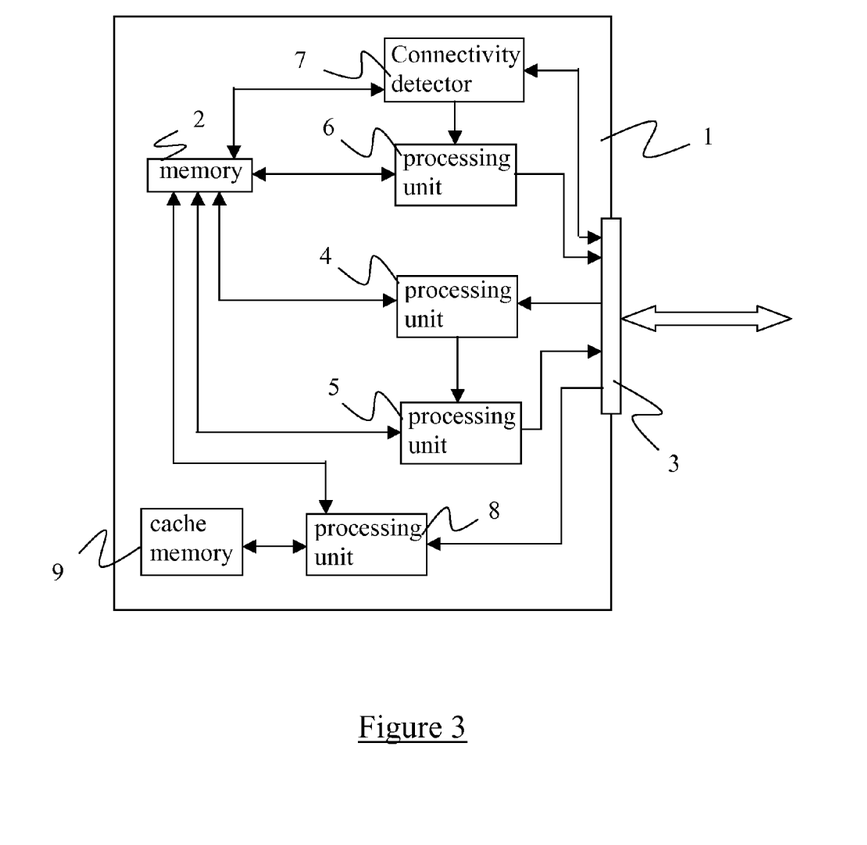
FIG. 3 illustrates schematically a node of the overlay network of FIG. 2.

Referring now to FIG. 3, there is illustrated schematically a node 1 of a DHT-based overlay network suitable for implementing the described mechanism. The node 1 comprises a memory 2 configured to store the routing table for the node. The node is provided with an interface 3 to other nodes in the overlay network (typically an interface to an IP network, e.g. the Internet). A first processing unit 4 is configured to receive Leave requests from neighbouring nodes via the interface 3. In the event that a Leave request is received, the first processing unit causes the routing table to be updated as described above. The Leave request is also received by a second processing unit 5 which determines if the departing node is the node that sent the request. If this is not the case, the second processing unit 5 inspects its routing table to identify any neighbouring nodes of the departing node of which the node that sent the request is unaware. It then constructs one or more further Leave requests and sends these to the identified nodes.

A third processing unit 6 is configured to handle the graceful departure of the node from the network. It does this by sending a Leave request to the node's neighbours, identifying one or more substitute mappings for each neighbouring node. This third processing unit is also configured to be notified by a connectivity detector 7, responsible for periodically sending keep-alive messages to neighbouring nodes, when a neighbour leaves the overlay network ungracefully, and to send appropriate Leave requests to neighbours of the departed node.

A fourth processing unit 8 maintains a cache within a memory 9, containing mappings for nodes not contained within the current routing table. In the event that the fourth processing unit receives a Leave request from a neighbour, the unit may extract a mapping from the cache memory and add this to the routing table.

Figure 4:
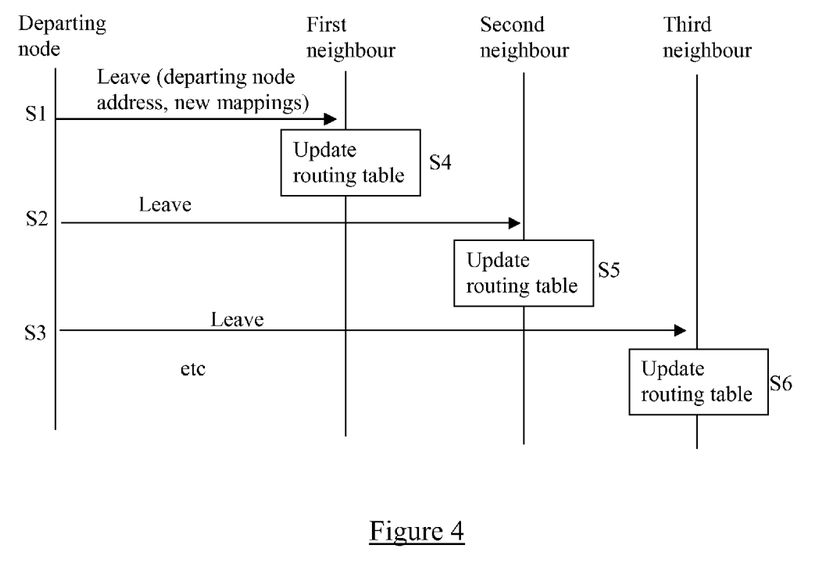
FIG. 4 is a flow diagram illustrating a mechanism for handling the graceful departure of a node from the overlay network of FIG. 2.

With reference now to FIG. 4, this illustrates the mechanism applied in the graceful departure scenario. At steps S1 to S3, the departing node sends Leave requests to its neighbouring nodes (only three of which are illustrated). At steps S4 to S6, each of the neighbouring nodes updates its routing tables.

Figure 5:
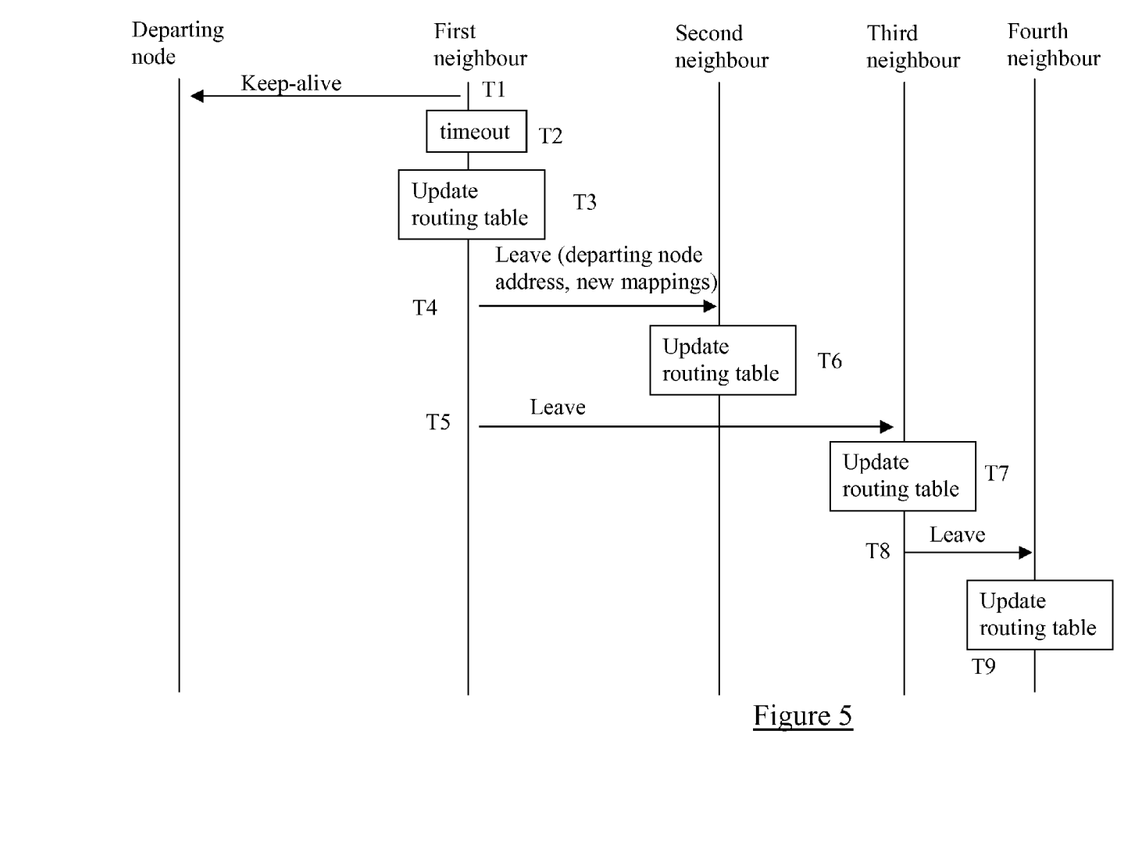
FIG. 5 is a flow diagram illustrating a mechanism for handling the ungraceful departure of a node from the overlay network of FIG. 2.

FIG. 5 illustrates the mechanism applied in the case of the ungraceful departure scenario. At step T1, a first neighbouring node of a departing node sends a periodic keep-alive message to the departing node. After a timeout T2 at the first neighbour during which no response to the keep-alive is received, the first neighbour updates its routing table at step T3 to delete the entry for the departed node. At steps T4 and T5, the first neighbour sends Leave requests to neighbours of the departed node, on behalf of the departed node. The contain new mappings as described above. Upon receipt of the Leave requests, at steps T6 and T7 the neighbours update their routing tables. One of the neighbours, in this case the third neighbour, is aware of a further neighbour of the departed node which the first neighbour is unaware of. At step T8 the neighbour sends a further leave request to that further neighbour. At step T9 the further neighbour updates its routing table.

As the mechanism described here improves the robustness of a DHT-based overlay network, it is especially useful for critical DHT-based systems such P2PSIP telephony networks such as are being standardized by the P2PSIP working group of the Internet Engineering Task Force (IETF).

It will be appreciated by those of skill in the art that various modifications may be made to the above described embodiment without departing from the scope of the present invention.

The invention claimed is:

1. A method of maintaining a plurality of routing tables at a respective plurality of nodes of a Distributed Hash Table (DHT) based overlay network, with each of the plurality of routing tables being maintained for a respective one of the nodes, the method comprising:

periodically exchanging DHT maintenance messages between the nodes of the DHT based overlay network to allow the nodes to learn of other nodes that have newly joined the DHT based overlay network, where a routing table of a given node contains, for each of a set of neighboring nodes including neighboring successor nodes and neighboring predecessor nodes, a mapping between an overlay network address of the neighboring node and a physical locator of the neighboring node;

upon or immediately prior to departure of a departing node from the DHT based overlay network, sending a Leave request from the departing node or one of the neighboring nodes of the departing node aware of the departure, to each neighboring recipient node or each other neighboring recipient node of the departing node, wherein the Leave request indicates the departure of the departing node and wherein the Leave request contains one or more mappings for nodes not contained within the routing table of at least one of the respective neighboring recipient nodes; and receiving the Leave request at each neighboring recipient node or at each other neighboring recipient node of the departing node and updating the respective routing table at the at least one of the neighboring recipient node using the one or more mappings contained in the Leave request.

2. A method of maintaining a plurality of routing tables at a respective plurality of nodes of a Distributed Hash Table (DHT) based overlay network, with each of the plurality of routing tables being maintained for a respective one of the nodes, the method comprising:

periodically exchanging DHT maintenance messages between the nodes of the DHT based overlay network to allow the nodes to learn of other nodes that have newly joined the DHT based overlay network, where a routing table of a given node contains, for each of a set of neighboring nodes including neighboring successor nodes and neighboring predecessor nodes, a mapping between an overlay network address of the neighboring node and a physical locator of the neighboring node;

immediately prior to departure of a departing node from the DHT based overlay network, sending a Leave request from the departing node to each neighboring node of the departing node, wherein the Leave request indicating the departure of the departing node and wherein the Leave request containing one or more overlay network address to physical locator mappings for nodes not contained within the routing table of at least one of the respective neighboring recipient nodes of the departing node; and receiving the Leave request at each neighboring node of the departing node and updating the routing table at the at least one of the respective neighboring recipient nodes of the departing node using the one or more mappings contained in the Leave request.

3. A method according to claim 2, wherein the one or more mappings contained within the Leave request corresponds to a neighboring node of the departing node which is unknown to the at least one of the neighboring recipient nodes of the departing node.

4. A method of maintaining a plurality of routing tables with each of the plurality of routing tables being maintained at a respective plurality of nodes of a Distributed Hash Table, (DHT) based overlay network, with each of the plurality of routing tables being maintained for a respective one of the nodes, comprising:

periodically exchanging DHT maintenance messages between the nodes of the DHT based overlay network to allow the nodes to learn of other nodes that have newly joined the DHT based overlay network, where a routing table of a given node contains, for each of a set of neighboring nodes including neighboring successor nodes and neighboring predecessor nodes, a mapping between an overlay network address of the neighboring node and a physical locator of the neighboring node;

upon departure of a departing node from the DHT based overlay network, sending a Leave request from one of the neighboring nodes of the departing node aware of the departure, to other neighboring nodes of the departing node, wherein the Leave request indicates the departure of the departing node and wherein the Leave request contains one or more mappings for nodes not contained within the routing table of at least one of the other neighboring nodes of the departing node receiving the Leave request; and receiving the Leave request at said each of the other neighboring nodes of the departing node and updating the routing table of at least one of the other neighboring nodes of the departing node using the one or more mappings contained in the Leave request.

5. A method according to claim 4, wherein the neighboring node sending the Leave request detects the departure of the departing node responsive to failure of the departing node to respond to periodically transmitted keep-alive messages, and wherein the neighboring node sends the Leave request responsive to detecting the departure of the departing node.

6. A method according to claim 4, wherein said one or more mappings for nodes not contained within the routing table of the at least one of the other neighboring nodes receiving the Leave request are one or more mappings contained within the routing table of the node sending the Leave request.

7. A method according to claim 4, wherein the Leave request comprises a first Leave request, the method comprising, at one of the other neighboring nodes of the departing node receiving the first Leave request, responsive to determining that the node receiving the first Leave request is aware of a next neighboring node of the departing node that is unknown to the node sending the first Leave request, sending a second Leave request to the next neighboring node, the second Leave request containing an overlay network address to physical address locator mapping for a node not contained within the routing table of the next neighboring node receiving the second Leave request, and, upon receipt of the second Leave request at the next neighbor node, updating the routing table of the next neighbor node.

8. A method according to claim 4, wherein the Leave request contains one of a new successor routing table part or a new and predecessor routing table part for each of the other neighboring nodes of the departing node receiving the Leave request.

9. A method according to claim 4, wherein said overlay network addresses are hash values.

10. A method according to claim 4, wherein updating the routing table comprises deleting the mapping corresponding to the departing node and adding the one or more mappings contained in the Leave request to the routing table.

11. A method according to claim 4 further comprising:
at nodes of the DHT based overlay network, caching one or more mappings for nodes not included within the respective routing tables and, in the event of the departure of a node from the DHT based overlay network, updating the routing table of at least one neighboring node of the departing node to include one or more of the cached mappings.

12. A node for use within a Distributed Hash Table (DHT) based overlay network comprising:
a memory for storing a routing table containing, for each of a set of neighboring nodes including neighboring successor nodes and neighboring predecessor nodes, a mapping between an overlay network address of the neighboring node and a physical locator of the neighboring node;

a processing unit configured to periodically exchange DHT maintenance messages with other nodes of the DHT based overlay network to allow the node to learn of other nodes that have newly joined the DHT based overlay network, and to send a Leave request to one or more of the recipient neighboring nodes of the node upon departure of the node or upon departure of a neighboring node from the DHT based overlay network, wherein the Leave request indicates the departure of the departing node and wherein the Leave request contains one or more overlay network address to physical locator mappings for nodes not contained within the routing table of at least one of the recipient neighboring nodes.

13. A node according to claim 12, wherein the Leave request comprises a transmitted Leave request, the node further comprising:
a second processing unit configured to receive a received Leave request from a neighboring node wherein the received Leave request identifies the departing node, to delete the mapping corresponding to the departing node identified in the received Leave request from the routing table contained within said memory of the node, and to add one or more new mappings contained within the received Leave request to the routing table.

14. A node according to claim 13 further comprising:
a third processing unit configured to determine if the received Leave request originates from the departing node and, if not, to inspect said routing table of the node to identify any neighboring nodes of the departing node of which the neighboring node sending the received Leave request is unaware, and to send the transmitted Leave request to the identified neighboring nodes.

15. A method of maintaining a plurality of routing tables with each of the plurality of routing tables being maintained for a respective node of an overlay network, the method comprising:
periodically exchanging maintenance messages between the nodes in order to provide updated addressing information for the nodes, where a routing table of a given node contains, for each of a set of neighboring nodes including neighboring successor nodes and neighboring predecessor nodes, a mapping between an overlay network address of the neighboring node and a physical locator of the neighboring node;

when addressing information is received at a given node for a peer node and the addressing information for the peer node is not included within the routing table of the given node, caching the addressing information for the peer node at the given node; and in the event that one of the neighboring nodes of the given node withdraws from the overlay network, adding the addressing information for the peer node to the routing table of the given node using the cached addressing information.

16. A method of maintaining a routing table at a given node of a plurality of nodes of a Distributed Hash Table (DHT) based overlay network, wherein a respective routing table is provided for each of the plurality of nodes of the DHT based overlay network, the method comprising:
assigning a respective overlay network address to each of the plurality of nodes of the DHT based overlay network, wherein each entry of the routing table of a respective one of the nodes is a mapping between an overlay network address of a respective neighboring node of the respective node, wherein neighboring nodes of the respective node include successor neighboring nodes and predecessor neighboring nodes of the respective node;

periodically exchanging DHT maintenance messages between the nodes of the DHT based overlay network to allow each node of the DHT based overlay network to learn of changes in respective neighboring nodes;

upon or immediately prior to departure of a departing node from the DHT based overlay network, sending a leave request from the departing node or from a transmitting neighboring node of the departing node, when the transmitting neighboring node of the departing node is aware of the departure, to a receiving neighboring node of the departing node, wherein the Leave request includes information regarding the departing node and the overlay network address of the departing node; and upon receiving the Leave request at the receiving neighboring node of the departing node, deleting the entry within the routing table of the receiving neighboring node of the departing node according to the overlay network address of the departing node in the Leave request.

* * * * *

UNITED STATES PATENT AND TRADEMARK OFFICE
CERTIFICATE OF CORRECTION

PATENT NO. : 8,526,331 B2  
APPLICATION NO. : 12/993990  
DATED : September 3, 2013  
INVENTOR(S) : Maenpaa Page 1 of 1

It is certified that error appears in the above-identified patent and that said Letters Patent is hereby corrected as shown below:

On Title Page 2, Item (56), References Cited under "OTHER PUBLICATIONS", in Column 1, Line 7, delete "127-140" and insert -- 127-140. --, therefor.

In the Specification

In Column 1, Line 20, delete "network" and insert -- network. --, therefor.

In Column 5, Line 67, delete "FIG. 2; and" and insert -- FIG. 2. --, therefor.

In Column 6, Line 59, delete "crates" and insert -- creates --, therefor.

In the Claims

In Column 10, Line 37, in Claim 2, delete "indicating" and insert -- indicates --, therefor.

In Column 10, Line 38, in Claim 2, delete "containing" and insert -- contains --, therefor.

In Column 10, Line 55, in Claim 4, delete "Table," and insert -- Table --, therefor.

In Column 10, Line 58, in Claim 4, delete "nodes, comprising:" and insert -- nodes, the method comprising: --, therefor.

Signed and Sealed this  
Eighteenth Day of February, 2014

Michelle K. Lee  
*Deputy Director of the United States Patent and Trademark Office*